(12) United States Patent
Sato et al.

(10) Patent No.: US 6,402,920 B1
(45) Date of Patent: Jun. 11, 2002

(54) CONCENTRATING COMPARTMENT AND SPACER CONSTRUCTION FOR ELECTRODEIONIZATION APPARATUS

(75) Inventors: Shin Sato; Fumio Arase; Takayuki Moribe, all of Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 09/657,462

(22) Filed: Sep. 7, 2000

(30) Foreign Application Priority Data

Sep. 22, 1999 (JP) .............................. 11-268990

(51) Int. Cl.[7] .......................... C25B 13/00; B01D 61/48
(52) U.S. Cl. ...................................... 204/636; 204/638
(58) Field of Search .............................. 204/633, 634, 204/635, 636, 638, 639

(56) References Cited

U.S. PATENT DOCUMENTS 5,316,637 A * 5/1994 Ganzi et al. ............. 204/182.4
6,123,823 A * 9/2000 Mani ........................ 204/632

FOREIGN PATENT DOCUMENTS

JP          6-506867          8/1994

* cited by examiner

Primary Examiner—Arun S. Phasge
Assistant Examiner—Thomas H Parsons
(74) Attorney, Agent, or Firm—Kanesaka & Takeuchi

(57) ABSTRACT

The electrodeionization apparatus is improved in concentration polarization of the ingredients including ions in the concentrating compartment so as to obtain the produced water with high purity. The electrodeionization apparatus has a spacer composed of a mesh and a frame-shaped gaskets superposed on the periphery of the mesh. The mesh has a thickness of 0.2 to 0.5 mm and the gaskets have thicknesses of equal to or less than 0.1 mm.

10 Claims, 2 Drawing Sheets

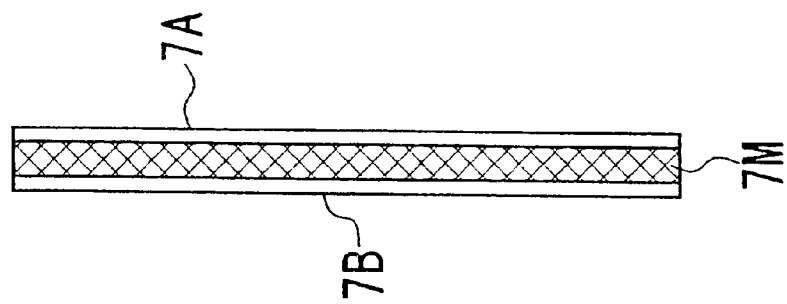
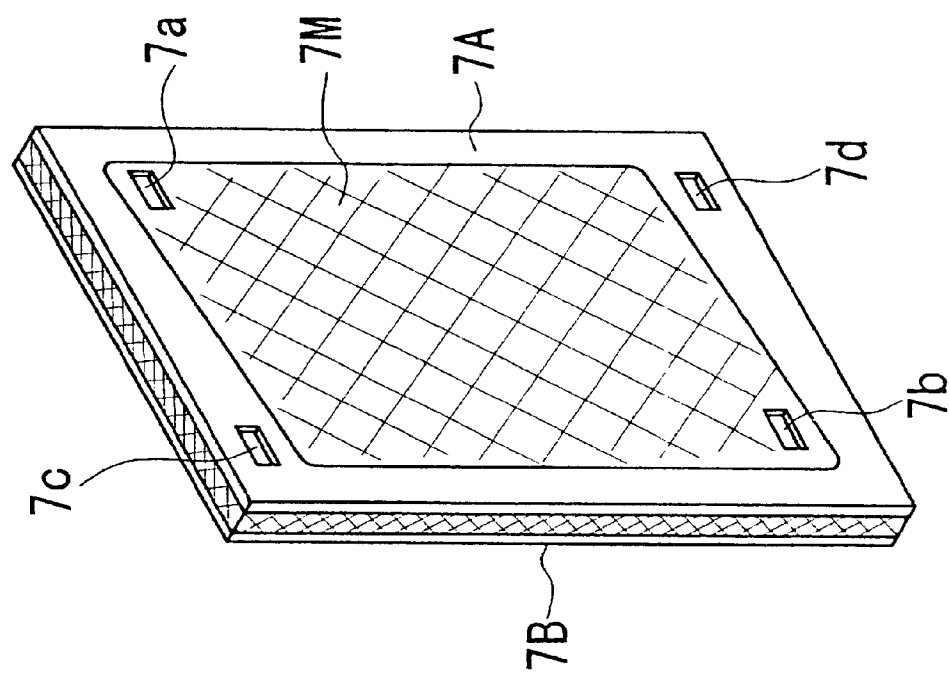

CONCENTRATING COMPARTMENT AND SPACER CONSTRUCTION FOR ELECTRODEIONIZATION APPARATUS

BACKGROUND OF THE INVENTION

1. Field of the Invention

The present invention relates to an electrodeionization apparatus having a structure in which a plurality of cation-exchange membranes and a plurality of anion-exchange membranes are alternately arranged between a cathode and an anode in such a manner as to alternately form a plurality of diluting compartments and a plurality of concentrating compartments, particularly to an electrodeionization apparatus which is improved in spacers for making up the concentrating compartments so that the quality of the deionized water produced by the apparatus is improved.

2. Description of the Related Art

An electrodeionization apparatus has been widely used for producing the deionized water in various kinds of industry and research establishments including manufacturing plants of semiconductors and liquid crystal displays, the pharmaceutical manufacturing industry, the food processing industry, the electric power industry and the like, because the electrodeionization apparatus has a good feature that makes it possible to produce a deionized water with exceedingly high purity in completely continuous service without maintenance such as regeneration which is indispensable to the ion-exchange resin.

An electrodeionization apparatus has a structure in which a plurality of cation-exchange membranes and a plurality of anion-exchange membranes are alternately arranged between electrodes in such a manner as to alternately form diluting compartments and concentrating compartments and the diluting compartments are filled with an ion exchanger. Voltage is applied between the cathode and the anode of the electrodeionization apparatus, water to be treated is introduced into the diluting compartments and concentrated water is introduced into the concentrating compartments, so that impurity ions permeate the membrane from the water to be treated to the concentrated water, thereby producing deionized water.

FIG. 2 is an exploded view showing the structure of the electrodeionization apparatus.

The electrodeionization apparatus includes a cathode end plate 1, a cathode 2 extending along the end plate 1, a cathode spacer 3 extending along the outer periphery of the cathode 2 which are superposed in this order. Further, a cation-exchange membrane 4, a frame 5 for defining a diluting compartment, an anion-exchange membrane 6, and a gasket 7 for defining a concentrating compartment are superposed on the cathode spacer 3 in this order. The cation-exchange membrane 4, the frame 5 for defining a diluting compartment, the anion-exchange membrane 6, the gasket 7 for defining a concentrating compartment compose one unit. The apparatus is composed of a plurality of such units superposed together. That is, membranes 4, frames 5, membranes 6, and gaskets 7 are repeatedly superposed one unit over the other unit. An anode 9 is superposed between the last anion-exchange membrane 6 and an anode spacer 8. An anode end plate 10 is superposed on the anodic electrode 9. The apparatus is tightened by bolts or the like.

The space defined by the inner surface of the frame 5 is the diluting compartment in which an ion exchanger 5R such as ion-exchange resin is filled. The space defined by the inner surface of the gasket 7 is a concentrating compartment. A mesh 7M is arranged inside the gasket 7 of a spacer for defining the concentrating compartment.

A direct electric current is supplied to pass between the anode 9 and the cathode 2, raw water to be treated is fed to the diluting compartment through a raw water inlet line 11, and concentrated water is fed to the concentrating compartment through a concentrated water inlet line 12. The raw water fed to the diluting compartment flows through a layer filled with the ion-exchange resin whereby impurity ion in the raw water is removed so as to make the raw water to deionized water which flows out through a deionized water outlet line 13.

The concentrated water fed to the concentrating compartment captures impurity ions which pass through the ion exchange membranes 4, 6 while flowing down through the concentrating compartment, and flows out from a concentrated water outlet line 14. Electrode water is passed within electrode compartments through introducing lines 15, 16 and discharging lines 17, 18, respectively.

FIG. 1a is a perspective view of showing the form of the spacer for defining the concentrating compartments, and FIG. 1b is a lateral view thereof. As shown in these figures, the spacer for defining the concentrating compartments has an integral structure consisting of the parallel frame-shaped gaskets 7A, 7B and the mesh 7M arranged between these gaskets. A reference numeral 7a denotes an inlet for the concentrated water, and a numeral 7b denotes an outlet for the concentrated water. Numerals 7c and 7d denote flow inlets for the raw water and deionized water respectively.

PCT-Japanese phase H6-506867 describes that an apparatus having spacers defining the concentrating compartments is improved in the efficiency of removing silica as the velocity of water flow in the concentrating compartment is increased.

SUMMARY OF THE INVENTION

While the electrodeionization apparatus efficiently provides the deionized water with exceedingly high purity in completely continuous service without maintenance including regeneration, there are further demands towards improvement in the purity of the produced water.

It is an object of the present invention to provide an electrodeionization apparatus which is improved in concentration polarization of ingredients including ions especially in the concentrating compartment so as to obtain the quality of the produced water with high purity.

An electrodeionization apparatus of the present invention is provided with concentrating compartments, each of which is composed of a mesh and a frame-shaped gasket superposed on periphery of the mesh, and diluting compartments defined by a plurality of ion exchange membranes between a cathode and an anode, wherein the mesh has a thickness in the range of 0.2 to 0.5 mm and the gasket has a thickness of equal to or less than 0.1 mm.

The inventors of the present invention found matters below-described by their elaborate study for the purpose of improving the quality of the produced water.

That is, in the electrodeionization apparatus, ingredients including ions removed from a diluting compartment travel into a concentrating compartment through an ion exchange membrane. On this occasion, in case the ingredients including the ions move slowly on the surface facing the concentrating compartment, the efficiency of removing the ingredients in the electrodeionization apparatus is deteriorated. Therefore, promotion of turbulence at a mesh portion so as to speed up the movement of the ingredients including the ions on the surface of the membrane of the concentrating compartment is important with regard to function of a spacer of the concentrating compartment.

Accordingly, the inventors further found that to thin the mesh portion of the spacer for defining the concentrating compartment to a thickness of 0.2 to 0.5 mm and the gasket portion thereof to a thickness of equal to or less than 0.1 mm improves adhesion of the mesh and the ion exchange membrane to prompt the turbulence, so that the produced water with high purity can be obtained to complete the present invention.

The spacer for defining the concentrating compartment of the present invention improves the efficiency of removing the ions to be ascribed to the promotion of occurrence of the turbulence at the mesh portion to accelerate the movement of the ions on the surface of the membrane facing the concentrating compartment. Further, the concentrating compartment is made thinner, so that the electrical resistance between electrodes can be lowered to improve the electrical efficiency.

BRIEF DESCRIPTION OF THE DRAWINGS

FIG. 1a is a perspective view of showing a form of a spacer for defining a concentrating compartment, and FIG. 1b is a lateral view thereof.

DETAILED DESCRIPTION OF THE INVENTION

Figure 2:
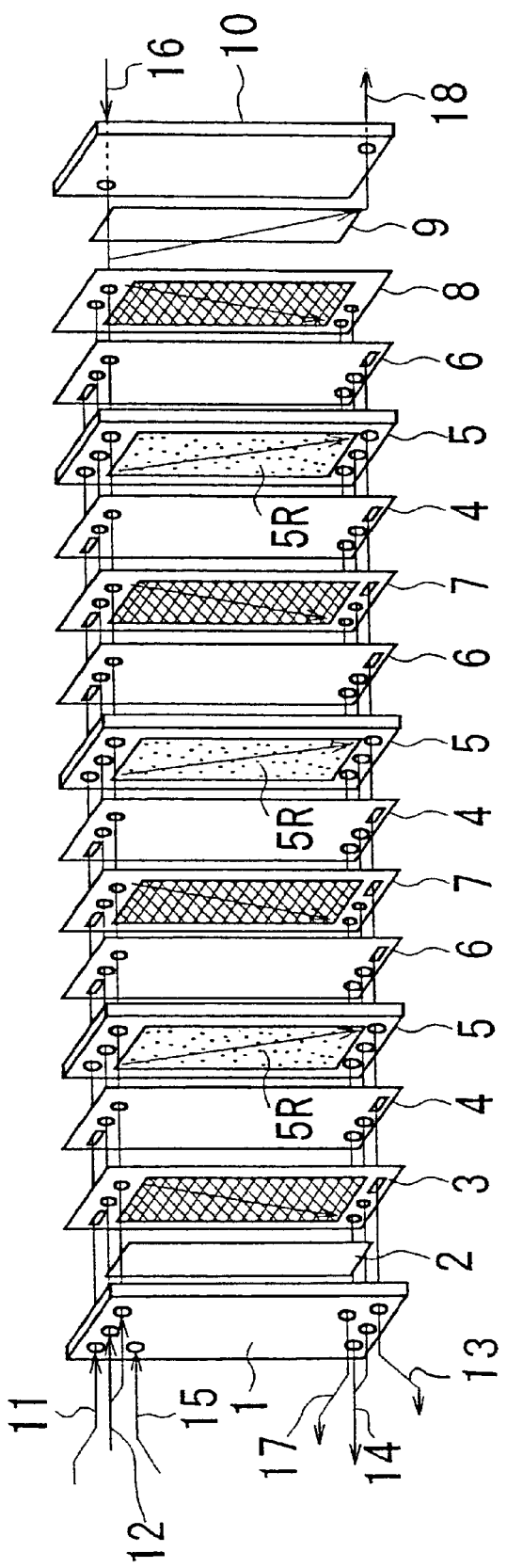
FIG. 2 is an exploded perspective view showing an electrodeionization apparatus according to the conventional one.

Hereinafter, embodiments of the present invention will be described with reference to the attached drawings.

An electrodeionization apparatus of the present invention has the same structure of a spacer for defining a concentrating compartment as conventional apparatuses. As shown in FIGS. 1a and 1b, the spacer is composed of parallel frame-shaped gaskets 7A, 7B and a mesh 7M arranged therebetween, in which the gaskets 7A, 7B are respectively superposed on the periphery of both faces of the mesh 7M.

The mesh 7M of the spacer should have a thickness of equal to or less than 0.5 mm. Particularly when the mesh 7M has a thickness of equal to or less than 0.4 mm, the quality of produced water is effectively improved. The thinner the mesh 7M is. the higher the effect of the promotion of turbulence becomes, but, on the other hand, the greater the pressure differential across the concentrating compartment becomes. Therefore, the mesh 7M has preferably a thickness of equal to or more than 0.2 mm.

Since the thinner the gaskets 7A, 7B are, the more closely the mesh adheres to an ion exchange membrane, the gaskets are preferable to have thicknesses of equal to or less than 0.1 mm, particularly equal to or less than 0.05 mm.

In the spacer for defining the concentrating compartment, the gaskets are usually arranged on both sides of the mesh for the purpose of prevention of water leak along the ion exchange membranes. As shown in FIG. 1, the gaskets 7A, 7B arranged on both sides of the mesh 7M may have the same thickness. The gaskets 7A, 7B may also have different thickness from each other. The thickness of each gasket should be equal to or less than 0.1 mm, preferably equal to or less than 0.05 mm.

The gasket may be arranged on only one side of the mesh, and the spacer provides enough sealing properties. The gasket on only one side of the mesh should have the thickness which is equal to or less than 0.10 mm. preferably equal to or less than 0.05 mm.

The lower limit of the thickness of the gasket varies depending on whether the mesh is provided with the gasket on one or both sides thereof. The lower limit of the thickness of the gasket is preferable to be 0.02 mm when the mesh is provided with the gaskets on both sides thereof, while it is preferable to be 0.03 mm when the mesh is provided with the gasket on only one side thereof.

While the mesh material is not limitative specifically, the mesh may be composed of polyester, polystyrene, polypropylene, nylon, polyethylene or the like. The mesh made from these materials may be covered or compounded with electrically conductive polymer of polypyrrole family or carbon. The mesh is preferable to have 10 to 60 meshes per one inch, a rate of aperture of 30 to 70%, and is preferable to be made up of strings having a diameter of 100 to 250 $\mu$m. The mesh may take any of the structures such as the cloth structure, the tier structure and the like, but is not limitative thereto.

The gasket material may be composed of thermoplastic elastomer (including polystyrene family, polyolefin family, fluororubber family etc.), CR rubber and the like, while it is not limitative thereto. The gasket is preferably formed to have a uniform dimension. The gasket material is preferable to have Brinell hardness on the order of 50 to 90 degree.

The electrodeionization apparatus of the present invention has the same structure as the conventional electrodeionization apparatus shown in FIG. 2 except that the spacer for defining the concentrating compartment is provided with the mesh and the gaskets having the thicknesses specified above. The diluting compartment adjoining the concentrating compartment is preferable to be filled with an ion exchanger including ion exchange resin, ion exchange fiber and the like from the view point of improvement in the quality of the produced water.

The electrodeionization apparatus of the present invention is preferable to be operated under conditions as follows.

The ratio of the flow rate at the inlet of the diluting compartment to those at the inlet of the concentrating compartment is preferable to be on the order of 1:1 to 10:1. A portion of the water flowing out from the outlet of the concentrating compartment may be fed back to the inlet of the concentrating compartment by a circulating pump so as to operate at high water recovery.

Whereas the linear flow rate in the concentrating compartment is not limited essentially, it is preferable to range so that Reynolds number is practically on the order of 30 to 200 when it is calculated in such a manner that portions occupied with the spacers are taken as vacant.

The pressure of the flow in the diluting compartment and the concentrating compartment is preferably in the range of 0.1 to 5.0 kg/cm$^2$. The water temperatures in the diluting compartment and the concentrating compartment may be in the range of 0 to 80° C., while these are not limitative.

EXAMPLES

Hereinafter, the present invention will be described referring to examples and comparative examples.

Example 1

Firstly, feed water is prepared from tap water. Namely, the tap water is treated by activated carbon, filtered by a protective filter having a size of apertures of 25 $\mu$m and also treated by a reverse osmosis (RO) apparatus having an RO membrane made of polyamide. The feed water is fed into the electrodeionization apparatus for treatment. In this treatment, the production rate of product water (deionized water) is 40 liters per hour. The flow rate in the concentrating compartment is 12 liters per hour, and 17 liters per hour in the electrode compartment. A portion of the water flowing out from the outlet of the concentrating compartment is fed back to the inlet of the concentrating compartment by a circulating pump so as to discharge the remaining water out of the system at the rate of 6 liters per hour. In this operation, the Reynolds number in the concentrating compartment is taken as 80.

The electrodeionization apparatus has three diluting compartments. Every compartment is filled with a mixture in which a cation ion exchange resin ("650C" produced by Dow Chemical Co.) and an anion exchange resin ("550A" produced by Dow Chemical Co.) are mixed together at the mixing ratio of 4:6. The apparatus is provided with a cation membrane (CMB) and an anion membrane (AHA) of "Neosepta" produced by Tokuyama Co., Ltd. as ion exchange membranes.

The apparatus also has two concentrating compartments. A spacer for defining the concentrating compartment is provided in such a manner that a polyester mesh is arranged with a gasket made of polystyrene on only one side thereof wherein the mesh has a thickness of 0.4 mm and the gasket has a thickness of 0.05 mm. The mesh has strings of 20 meshes per one inch, the ratio of aperture of 50% and mesh cloth structure in which the thickness of the strings is 220 micron. The gasket has Brinell hardness of 75.

The treatment is carried out under conditions as follows. The resistivity of produced water is measured after 3 days have elapsed, the result of which is shown in Table 1.

Water temperature: 25° C.

Pressure at the inlet of the diluting compartment :1.3 to 1.5 kg/cm$^2$

Pressure at the outlet of the diluting compartment: 0.6 to 0.8 kg/cm$^2$

Pressure at the inlet of the concentrating compartment: 1.1 to 1.3 kg/cm$^2$

Pressure at the outlet of the concentrating compartment: 0.4 to 0.6 kg/cm$^2$

Electric current intensity: 0.4A

Comparative Example 1

The same treatment as Example 1 is carried out except that the mesh of the concentrating compartment has a thickness of 0.68 mm and the gasket has a thickness of 0.25 mm. The resistivity of produced water obtained after 3 days feeding is shown in Table 1.

TABLE 1

| | resistivity (MΩ · cm) |
|---|---|
| Example 1 | 17.2 |
| Comparative Example 1 | 14.0 |

Table 1 shows that the electrodeionization apparatus having the spacer defining the concentrating compartment of the present invention provides the produced water having high purity.

As detailed above, according to the electrodeionization of the present invention, the produced water having exceedingly high purity is efficiently obtained.

What is claimed is:
1. An electrodeionization apparatus comprising:
   a cathode;
   an anode; and
   concentrating compartments and diluting compartments alternately formed by arranging a plurality of cation exchange membranes and anion exchange membranes between the cathode and the anode, each of said concentrating compartments comprising a spacer formed of a mesh and a gasket having a form of a frame and superposed on a periphery of the mesh, wherein the mesh has a thickness in a range of 0.2 to 0.5 mm and the gasket has a thickness of equal to or less than 0.1 mm.
2. An electrodeionization apparatus claimed in claim 1, wherein said mesh has a thickness of equal to or less than 0.4 mm.
3. An electrodeionization apparatus claimed in claim 1, wherein said gasket has a thickness of equal to or less than 0.05 mm.
4. An electrodeionization apparatus claimed in claim 1, wherein said gasket is superposed on two sides of said mesh.
5. An electrodeionization apparatus claimed in claim 4, wherein said gasket has a thickness of equal to or more than 0.02 mm.
6. An electrodeionization apparatus claimed in claim 1, wherein said gasket is superposed on only one side of said mesh.
7. An electrodeionization apparatus claimed in claim 6, wherein said gasket has a thickness of equal to or more than 0.03 mm.
8. An electrodeionization apparatus claimed in claim 1, wherein said mesh has 10 to 60 meshes per one inch.
9. An electrodeionization apparatus claimed in claim 1, wherein said mesh is made up of strings having a diameter of 100 to 250 μm.
10. An electrodeionization apparatus claimed in claim 1, wherein said mesh has a rate of aperture of 30 to 70%.

* * * * *